(12) United States Patent
Andersen et al.

(10) Patent No.: US 6,352,179 B1
(45) Date of Patent: Mar. 5, 2002

(54) POURING SPOUT FOR MOUNTING ON A CONTAINER

(75) Inventors: Bjarne Bo Andersen, Holte; Henrik Holbæk; Clause Jensen, both of Copenhagen, all of (DK)

(73) Assignee: Eva Denmark A/S, Rodovre (DK)

( * ) Notice: Subject to any disclaimer, the term of this patent is extended or adjusted under 35 U.S.C. 154(b) by 0 days.

(21) Appl. No.: 09/633,403

(22) Filed: Aug. 7, 2000

(30) Foreign Application Priority Data

Aug. 12, 1999 (DK) ........................................ 1999 01116

(51) Int. Cl.[7] .............................................. B65D 47/40
(52) U.S. Cl. ...................... 222/108; 222/569; 222/571
(58) Field of Search ................................ 222/108, 109, 222/111, 569, 571

(56) References Cited

U.S. PATENT DOCUMENTS

| 164,128 | A | * | 6/1875 | Babbitt ........................ 222/111 |
| 2,722,346 | A | * | 11/1955 | Yokota ...................... 222/108 X |
| 2,808,964 | A | * | 10/1957 | Radtke ........................ 222/111 |
| 2,848,142 | A | * | 8/1958 | Livingstone ................ 222/111 |
| 2,851,196 | A | * | 9/1958 | Livingstone ................ 222/111 |
| 2,915,223 | A | * | 12/1959 | Beall, Jr. .................... 222/109 |
| 3,491,925 | A | * | 1/1970 | Sundgren .................... 222/571 |
| 3,628,697 | A | * | 12/1971 | Dowson et al. ............. 222/111 |
| 4,128,189 | A | * | 12/1978 | Baxter ........................ 222/109 |
| 4,298,145 | A | * | 11/1981 | Iida ........................ 222/109 X |
| 4,427,138 | A | * | 1/1984 | Heinlein ................ 222/571 X |
| 5,207,356 | A | * | 5/1993 | Krall ........................... 222/109 |

FOREIGN PATENT DOCUMENTS

| FR | 2 265 628 | * | 11/1975 |
| JP | 2000-168821 | * | 6/2000 |

* cited by examiner

*Primary Examiner*—Kenneth Bomberg
(74) *Attorney, Agent, or Firm*—William J. Sapone; Coleman Sudol Sapone P.C.

(57) ABSTRACT

According to the invention, a pouring spout for mounting on a container's neck can be configured as a spout placed in the container's neck, which spout goes on the inside of the neck so that possible drops of liquid will be collected inside the neck. Drops of liquid running on the outside of the container are hereby avoided and at the same time it is achieved that the container can pour in all directions since the edge of the pouring spout extends uniformly around the container's neck.

7 Claims, 2 Drawing Sheets

Figure 1:
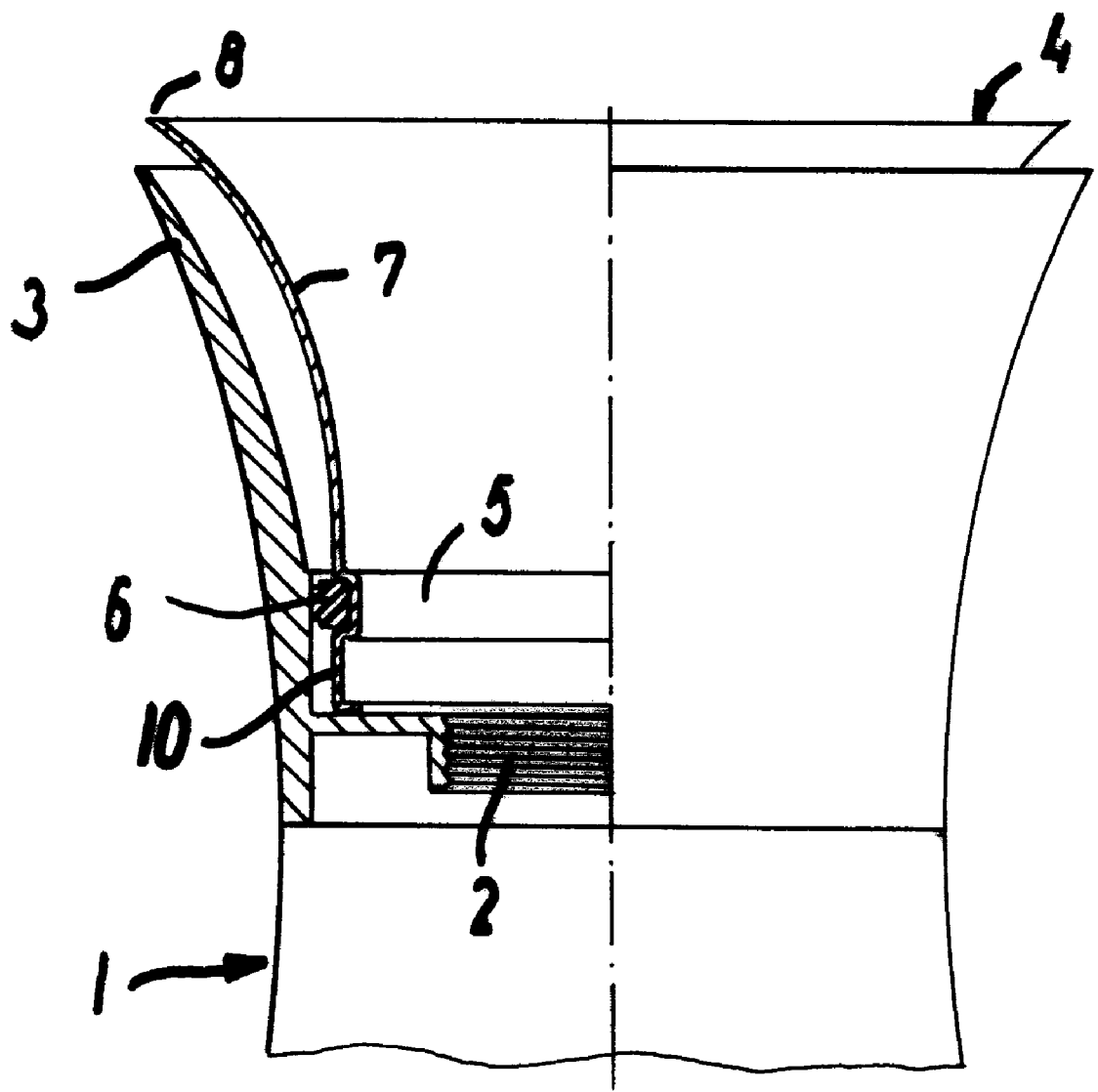

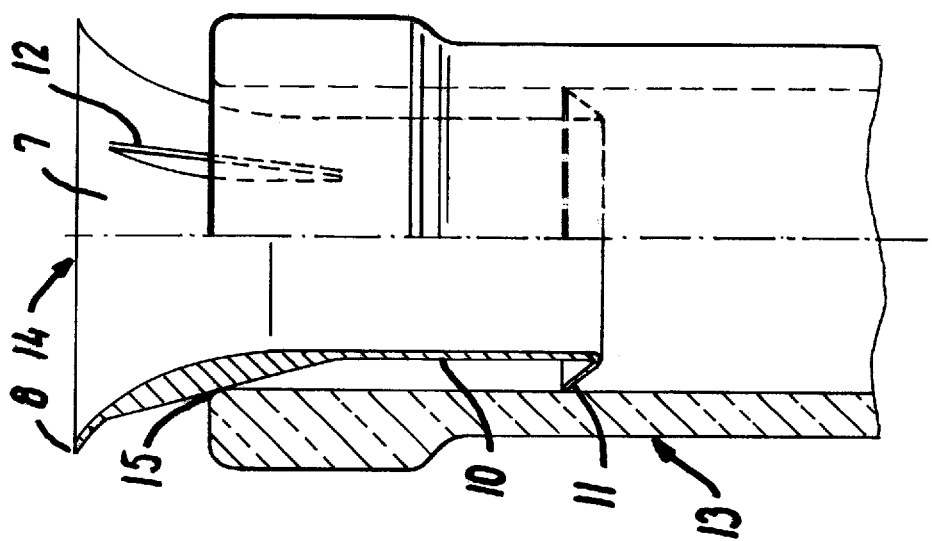
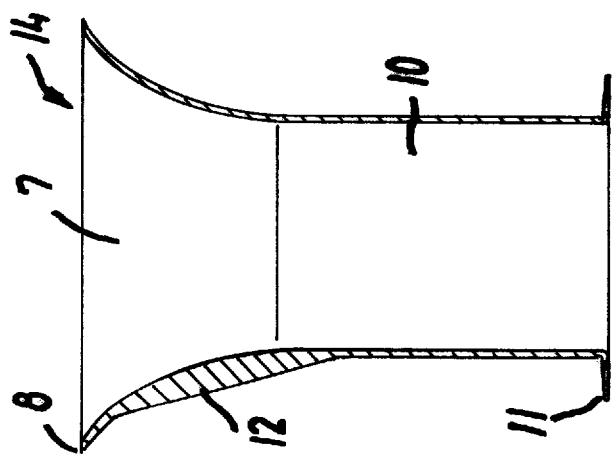
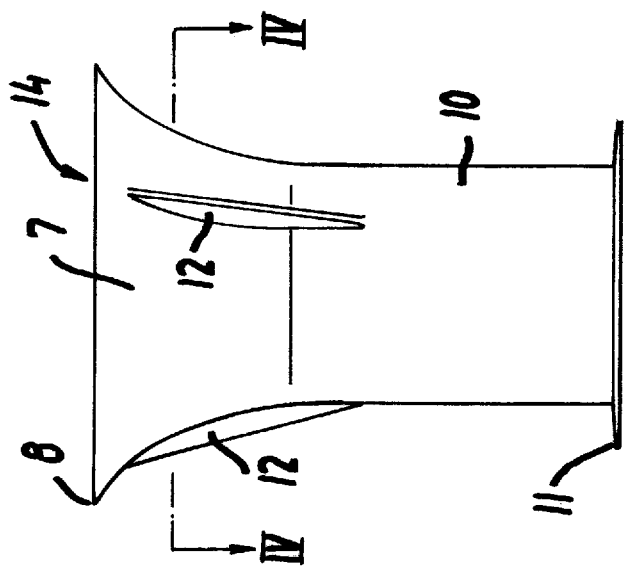
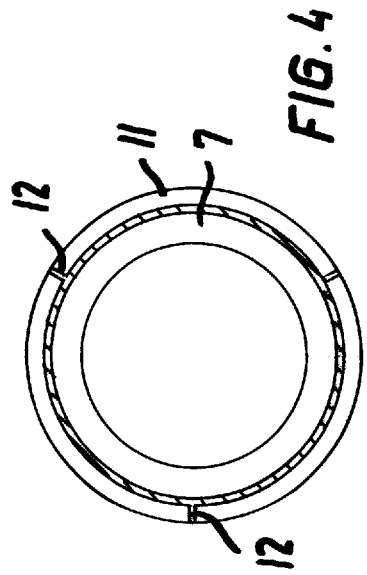

POURING SPOUT FOR MOUNTING ON A CONTAINER

The invention concerns a pouring spout for mounting on the neck of a container, the neck of a flask or a bottleneck, said pouring spout forming a channel between its outer side and the inside of the neck for the collection of possible drops of liquid when the container is raised upright after the pouring-out.

When pouring liquids out of a container, such as a thermos flask or bottle, liquid will often be left remaining on the spout which, when the container is raised, possibly collects in drop form and drips down or runs down the container.

Many attempts have been made to eliminate this disadvantage, especially in the form of diverse configurations of separate pouring spouts.

However, it is common to all these pouring spouts that the way in which they function is based on outflow in one and only one direction, i.e. in a groove or channel which terminates in one or another kind of edge. The risk that the liquid can collect at the edge area is hereby reduced, but in the case of liquid, this will run down on the outer side of the outflow part configured with the groove or channel.

To this must be added that the container must be orientated in a certain manner, in that the liquid must be poured out running in the groove or the channel.

If the container is not orientated precisely in this manner, the liquid will flow around the outflow part and herewith eliminate the function of this pouring spout. For this reason, flasks are provided with a handle in order to ensure the orientation during the pouring-out. Containers without this handle are therefore difficult to pour with in a drip-free manner, since as mentioned it requires careful orientation in order to ensure that the liquid flows precisely in the outflow groove.

Where wine bottles are concerned, the same problem arises when using pourers.

From the description of U.S. Pat. No. 1,683,176, a solution to the drip problem is known in the form of a sleeve which is placed on the outside of the bottleneck, said sleeve forming a collection groove for drips between the inner side of the sleeve and the outer side of the bottle. The groove is closed at the bottom so that the collected liquid can run out at the next pouring. However, this solution is encumbered with the disadvantage that the liquid runs on the outside of the bottle, which is not particularly elegant or hygienic. To this is added the problem of securing the sleeve on the neck of the bottle, since bottles exist in many different sizes both in length and diameter. In other words, in order to cover all shapes of bottles, sleeves must be produced in many different sizes.

THE OBJECT OF THE INVENTION

It is the object of the invention to overcome these drawbacks and disadvantages of the known pouring spouts, and according to the invention this is achieved in that the outside of the pouring spout is smaller than the opening, clearance, in the neck, so that the drops are caught inside the neck.

In this surprisingly simple manner, it is ensured that possible liquid runs internally in the pouring spout or the bottle, in that the liquid will pass inside the spout or the neck of the bottle. The disadvantage of liquid running down the outside of the container or the bottle is hereby eliminated.

Moreover, the pouring spout is independent of the orientation of the container, the flask or the bottle, in that the pouring spout functions in all directions. Flasks or containers can hereby be configured without handles, which is a great advantage from the point of view of both design and production.

As disclosed in claim 2, by letting the upper edge of the pouring spout extend higher than the neck on the flask or the bottle, an effective cutting-off of the liquid is ensured after the pouring-out, and an effective accumulation of the liquid in the collection gap.

As disclosed in claim 3, by mounting a seal on the lower part of the pouring spout, and letting this tighten against the inside of the neck, a safeguard is ensured while pouring-out against the outflow of liquid via the channel, and at the same time a closed chamber for dripped-off liquid is formed.

As disclosed in claim 4, by configuring the upper part of the pouring spout with a outwardly-curved, trumpet shaped, an even and uniform outflow of liquid is ensured when pouring-out.

As disclosed in claim 5, by sharpening the outflow edge on the top of the pouring spout, the amount of liquid which can adhere to the edge and drip is minimised.

As disclosed in claim 6, by configuring the outside of the pouring spout with evenly distributed ribs, it will always remain centrally placed in a bottleneck, hereby ensuring an effective function of the pouring spout on bottles.

Finally, as disclosed in claim 7, it is expedient to configure the seal as a resilient lip which can ensure both tightness and the securing of the pouring spout in the bottleneck.

THE DRAWING

In the following, example embodiments of a pouring spout according to the invention will be described in more detail with reference to the drawing, where FIG. 1 shows an example of a pouring spout partly in section placed on a container such as a thermos flask, FIG. 2–4 show an example of a pouring spout for bottles, and FIG. 5 shows a partly sectional view of a pouring spout placed on a bottle.

DESCRIPTION OF THE EXAMPLE EMBODIMENTS

In FIG. 1 there is shown a first embodiment of a pouring spout for use on a thermos flask 1 or similar container.

The container does not have a handle, and its own pouring spout 3 is therefore configured as an annular collar which ends in an edge.

Without pouring spout, this container will have a tendency to drip liquid from the outflow spout.

To avoid this, a pouring spout 4 according to the invention is mounted, said pouring spout being configured with a lower cylindrical collar 10 which rests against the top of the flask 1 with outflow hole 2 possibly with thread for a not-shown closing stopper.

On the collar 10 there is configured an annular groove or seating 5 for a sealing ring 6 which lies in a tightening manner up against the inside of the outflow edge 3 of the flask.

The upper part of the outflow spout 4 is configured as an outwardly-curving collar 7 which extends a small distance up over the edge 3 of the flask, and substantially to the same outward extent as this edge.

The collar 7 ends in an edge 8 which is suitably sharp. This is to minimise the risk of adherence to this edge portion after pouring out.

The way in which this pouring spout functions is that it can be mounted on any flask with a normal, upwardly-extending outflow funnel 3. When the stopper is removed from the outflow opening 2, upon tipping of the edge liquid will run down over the outflow part 7, over the edge 8 and further.

When the pouring ceases, the liquid in the outflow spout 7 will run back into the container, possibly leaving a small amount of liquid in the edge zone 8.

This liquid will, however, run down in the gap which is formed between the outside of the outflow part 7 and the inside of the mouth 3 of the flask, and is collected there due to the sealing ring 6.

The liquid thus remains in the flask and will in no way be able to soil the outside of the flask, which can therefore always be held clean and free from deposits of tea, coffee and the like.

The pouring spout does not interfere with the remaining functions and working mode of the flask in any way whatsoever, and this can thus be handled and used in the completely normal manner.

The pouring spout can be made either of metal or plastic or a combination hereof.

A further embodiment will now be described with reference to FIGS. 2–5.

This pouring spout 14 is dimensioned in such a way that it can be inserted in the neck of a bottle, e.g. a wine bottle as illustrated in FIG. 5.

The pouring spout comprises a lower cylindrical part 10, the diameter of which is smaller than that of the bottleneck, so that it forms an annular gap between the lower part 10 and the bottle 13, as shown in FIG. 5.

At the lower end there is configured a seal 11, e.g. in the form of an integrated, annular elastic flap or lip, which is suitably elastic to be able to create tightness, and to function as a securing flange for the pouring spout 14 when this is pressed down into the neck of the bottle 13.

As indicated in FIG. 5, this flange 11 will secure the pouring spout in the bottle, and it will require an extra force to remove it from the bottle, in that the flange 11 will function as a barb. Therefore, the pouring spout will not be able to fall out of its own accord when being used.

At the top, the pouring spout expands into an outwardly-curved collar 7 which ends in a sharp edge 8.

In order to control the central positioning of the pouring spout in the bottleneck, projections or ribs 12 are provided on the outer side of the collar 7, as shown in FIG. 5. These ribs will lie up against the upper edge 15 of the bottle and ensure the central positioning of the pouring spout.

For this purpose, at least three ribs 12 placed in an equidistant manner are required. The pouring spout with this embodiment will function in the same way as that described earlier, i.e. it will ensure an even outflow and minimum drip from the outflow groove. Possible drip will remain inside the bottleneck and be accumulated in the collection groove, so that the outside of the bottle is kept free of drips and herewith discolouring.

This pouring spout 14 also functions in all directions, and thus the bottle does not need to be orientated before pouring out.

This pouring spout will similarly be able to be produced in metal or plastic material or a combination hereof.

Moreover, it has no unfortunate influence on the function of the bottle that it will otherwise easily be able to be equipped with a loose stopper, so that the pouring spout can also function as a closing stopper with the view to later pouring out.

What is claimed is:

1. A pouring spout mounted in a container having a neck, the pouring spout comprising an outer side, an outflow spout and means for securing the pouring spout in the neck of the container, the outer side being smaller than an inside surface of the neck, three or more ribs which extend out from the outer side of the outflow spout, to engage an upper part of the neck for positioning the pouring spout centrally in the neck, a gap provided between the outflow spout and the neck such that a channel is formed between the outer side of the pouring spout and the inside surface of the neck whereby drops of liquid from the outflow spout enter the gap and collect in the channel when the container is raised upright after pouring.

2. The pouring spout of claim 1 wherein the pouring spout has an upper edge which extends over the neck.

3. The pouring spout of claim 1 wherein the pouring spout has a lower part, a seal located in the lower part, the seal abutting against the inside surface of the neck.

4. The pouring spout of claim 1 wherein the pouring spout has a cylindrical lower part and said outflow spout is outwardly curved.

5. The pouring spout of claim 1 wherein the outflow spout has a sharp upper edge.

6. The pouring spout of claim 1 wherein the securing means is an annular lip which abuts the inside surface of the neck, the annular lip forming a seal against the inside surface of the neck.

7. The pouring spout of claim 1 wherein the container is a bottle.

\* \* \* \* \*